United States Patent [19]

Dischert et al.

[11] 4,376,957
[45] Mar. 15, 1983

[54] TRANSMISSION SYSTEM WITH SEQUENTIAL TIME-COMPRESSED BASEBAND COLOR

[75] Inventors: Robert A. Dischert, Burlington; Robert E. Flory, Princeton, both of N.J.

[73] Assignee: RCA Corporation, New York, N.Y.

[21] Appl. No.: 124,107

[22] Filed: Feb. 25, 1980

[51] Int. Cl.³ .............................................. H04N 5/79
[52] U.S. Cl. .................................... 358/334; 358/310; 358/328
[58] Field of Search .................... 358/4, 8, 12, 9, 310, 358/328, 334

[56] References Cited

U.S. PATENT DOCUMENTS

| | | | |
|---|---|---|---|
| 3,255,303 | 6/1966 | Kihara | 178/5.2 |
| 3,604,847 | 9/1971 | Ganske | 178/6.6 |
| 3,717,725 | 2/1973 | Numakura | 178/5.4 |
| 3,723,643 | 3/1973 | Suzuki | 178/6.6 |
| 3,748,376 | 7/1973 | Parker | 178/5.4 |
| 4,063,290 | 10/1977 | Metildi | 360/9 |
| 4,074,307 | 2/1978 | Dischert et al. | 358/8 |
| 4,084,181 | 4/1978 | Mita et al. | 358/12 |
| 4,090,214 | 5/1978 | Wright | 358/4 |
| 4,163,248 | 7/1979 | Heitmann | 358/12 |

FOREIGN PATENT DOCUMENTS

| | | | |
|---|---|---|---|
| 52-16925 | 2/1977 | Japan | 358/4 |
| 55-120289 | 9/1980 | Japan | 358/4 |
| 1225683 | 3/1971 | United Kingdom | |
| 1372822 | 11/1974 | United Kingdom | |
| 1373943 | 11/1974 | United Kingdom | |

OTHER PUBLICATIONS

"Color TV Training Manual", published by Howard W. Sams, Fourth Edition, 1972, pp. 33-37, 123-128.

*Primary Examiner*—Stuart N. Hecker
*Attorney, Agent, or Firm*—E. M. Whitacre; W. H. Meise

[57] ABSTRACT

An improved transmission arrangement for a color television signal includes a time-division multiplexing apparatus for alternately presenting for transmission through a single channel baseband signals defining the chrominance information of the television signal. In order to provide improved resolution, a store is coupled to the signal source for storing at a writing rate a first of the baseband components during the time at which it is generated. A read generator is coupled to the store for reading the stored baseband component at a higher data rate than that at which it was generated. The baseband component is transmitted through the single channel at the higher data rate.

10 Claims, 17 Drawing Figures

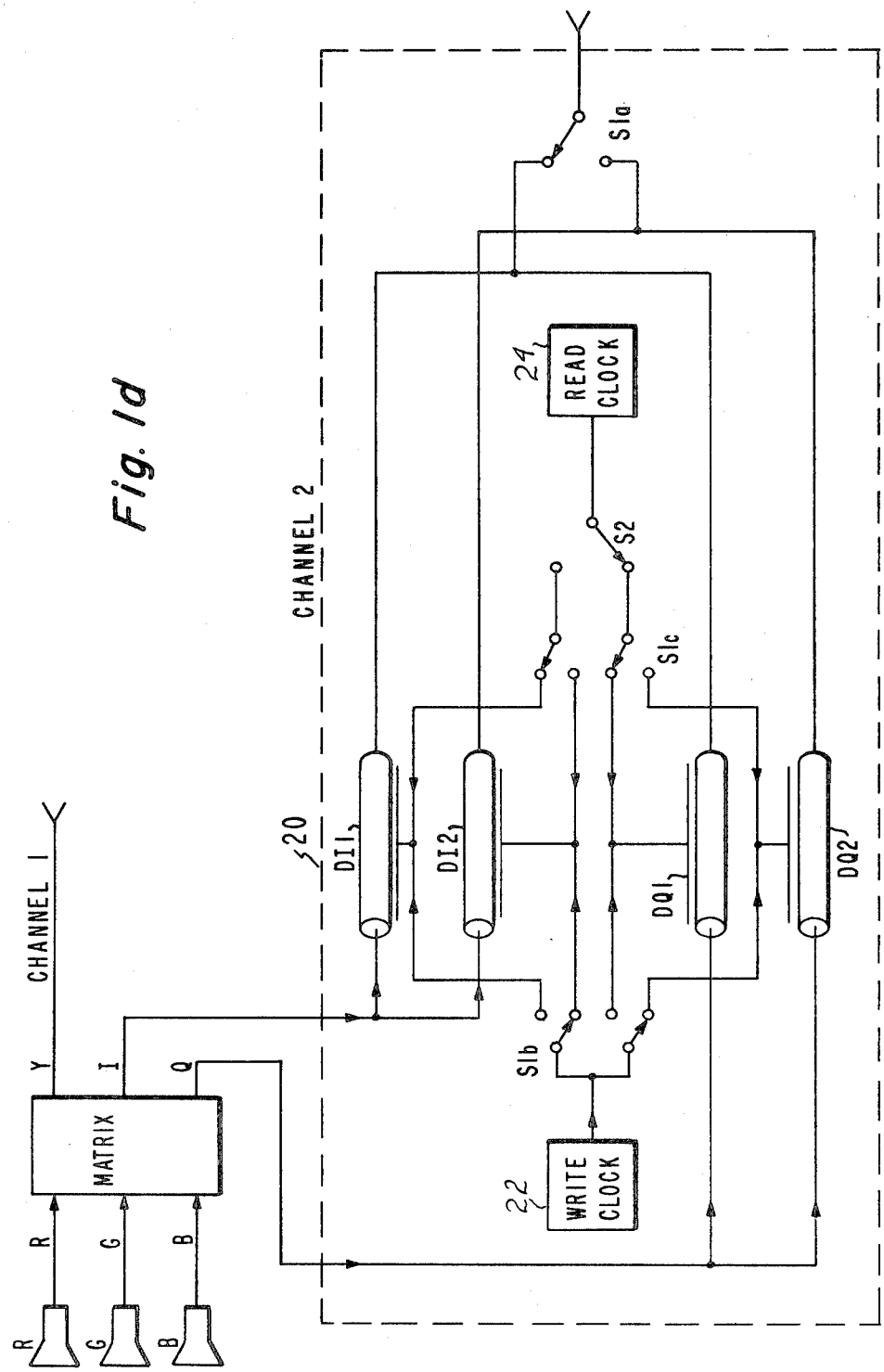

TRANSMISSION SYSTEM WITH SEQUENTIAL TIME-COMPRESSED BASEBAND COLOR

BACKGROUND OF THE INVENTION

This invention relates to a transmission system for color television signals having improved signal-to-noise (SN). In magnetic recording of television signals by video tape recorders, the record or playback head may occasionally fail to come into contact with the magnetic oxide coating because of variations in tape tension, build up of dirt on the heads and the like. This may cause a reduction in the amplitude of the signal transduced from the tape to the playback head, and may result in objectionable distortion. It is known to frequency-modulate a carrier with the video information to be recorded. Such frequency modulation of the signal translates amplitude changes of the video signal into frequency changes of the carrier. An amplitude limiter coupled to receive the frequency-modulated signal strips away amplitude variations resulting from imperfect head contact, and the frequency-modulated signal when demodulated has an improved signal-to-noise compared with the case of direct recording.

When color television signals encoded in a standard NTSC manner including luminance components and chrominance components quadrature-modulated onto a color subcarrier are recorded, the total frequency bandwidth of the video signal is large. When it is desired to record such an NTSC signal, it is found that the total bandwidth of the NTSC signal is so large that the sidebands of the frequency-modulated carrier extend over a greater frequency band than can be encompassed within the FM channel of the recorder. Consequently, the "color under" system has been used in the past. In this system, the color subcarrier, quadrature modulated with chroma components, is directly recorded at a low frequency on the same tape track with an FM carrier modulated by video luminance information. To improve linearity, the directly recorded chrominance information is recorded with the aid of a bias signal. To prevent interaction between the bias signal and the frequency-modulated carrier, the FM carrier is often used as the bias signal. While such an arrangement allows recording of a color television signal on a single track of a video tape recorder, certain problems exist, such as poor SN of the chrominance signal, crosstalk between the two quadrature-modulated color signals, and limited frequency bandwidth which necessitates reduction of the desired bandwidth in either the chrominance or luminance information, or possibly both. Furthermore, the FM luminance carrier cannot be modulated to the maximum possible amount because maximum modulation drives the recording medium into saturation, adding distortion to the directly recorded chrominance information.

In order to improve the quality of the television signal to broadcast standards, the luminance information may be recorded on a first track of the tape by the use of a frequency-modulated carrier, while at the same time recording the quadrature-modulated chrominance information onto a second track of the tape adjacent the first. The chrominance information is modulated onto a frequency-modulated carrier for improved signal-to-noise. It has been found, however, that broadcast quality may not be achieved even in such a system using two wideband channels for the recording of the video information. Furthermore, it has been found that cross-modulation occurs between the two components of the chrominance signal.

FIG. 8 illustrates an amplitude-frequency diagram. In FIG. 8, a frequency FO illustrates the rest frequency of a frequency-modulated carrier. FLO and FHI represent the lower and upper deviation frequency limits, respectively. An envelope 810 illustrates the amplitude-frequency characteristic of a transmission channel generally including, for example, a tape recorder channel. At frequencies F14 and F16 the response of the channel is reduced due to filters, inherent frequency limitations and the like. A series of spectral lines 812 illustrates generally the distribution of energy which results from modulating the carrier with a relatively low-frequency video signal. Many spectral lines appear, the amplitude of which depends upon the amplitude of the modulating signal. FIG. 9 illustrates the response of the same system modulated with a relatively high-frequency video signal. Very few spectral lines 822 appear within the passband defined by curve 810. Other spectral lines illustrated as 824 are cut off and do not appear. It has been established that the signal-to-noise ratio of a frequency-modulated transmission channel such as that described is degraded at higher modulating frequencies. This may be explained by the loss of many of the spectral lines associated with the information of the signal in the case of the high-frequency signal, as compared with the low-frequency situation in which large numbers of spectral lines are carried through the channel.

In order to obtain improved characteristics for a two-channel tape recorder or other transmission system, it is desirable to reduce the frequency of the signal modulating the chrominance channel. Comparison of the bandwidth of the baseband I and Q signals of FIGS. 3a and 3b with the bandwidth of the I and Q signals quadrature-modulated onto a subcarrier, as illustrated in FIG. 3f, reveals that each of the baseband signals alone has a lesser bandwidth than does the modulated signal. The frequency bandwidth of the signal modulating the chrominance channel may be reduced by alternately modulating the frequency-modulated carrier in the chrominance signal channel with one of the two chrominance signals representing the chrominance information. For example, if the chrominance information is represented by I and Q signals, where the I signal has a frequency bandwidth of 1 MHz and the Q signal has a frequency bandwidth of 0.5 MHz, each of these signals is alternately modulated onto the carrier for coupling into the channel. Alternation, however, results in a loss of I signals during that interval in which Q signals are being carried through the system, and similarly Q signals are lost during that interval in which I signals are being processed. Thus, there is a loss in signals similar to that which occurs in a SECAM system. In the SECAM system, the line-to-line alternation of the chrominance information results in a reduced vertical chrominance resolution which degrades the picture. U.S. Pat. No. 4,163,248 issued July 31, 1979 to Heitmann describes a system for alternately processing luminance and chrominance information through a digital field store; the loss of information is concealed by repetition of the stored chrominance information during display of unstored luminance and repetition of stored luminance information during display of unstored chrominance. A television transmission system, which may include a record, and having high signal-to-noise, low cross-modulation and high resolution (no information loss) in the chrominance channel is desirable.

SUMMARY OF THE INVENTION

An improved color television signal transmission arrangement for a color television signal, where the signal includes a plurality of baseband components which define luminance and chrominance information. The transmission arrangement includes a transmission channel and a time-division multiplexer for alternately presenting for transmission the baseband components defining the chrominance information. The time-division multiplexer switches at a rate established by the television horizontal line rate. Storage means are included in the transmission arrangement for storing at a writing rate a first of the plurality of baseband components which define at least a portion of the chrominance information. The storage occurs during the time at which that first baseband component is generated. A reading arrangement is coupled to the store and to the time-division multiplexer for reading from the store the first baseband component. The reading from the store of the first baseband component is at a rate different from the writing rate for providing time compression or expansion. The first baseband component read from the store is supplied to the time-division multiplexer for presentation for transmission.

DESCRIPTION OF THE DRAWING

FIGS. 1a–1d show in various operating states a transmission system including a signal processor embodying the invention;

DESCRIPTION OF THE INVENTION

Figure 1A:
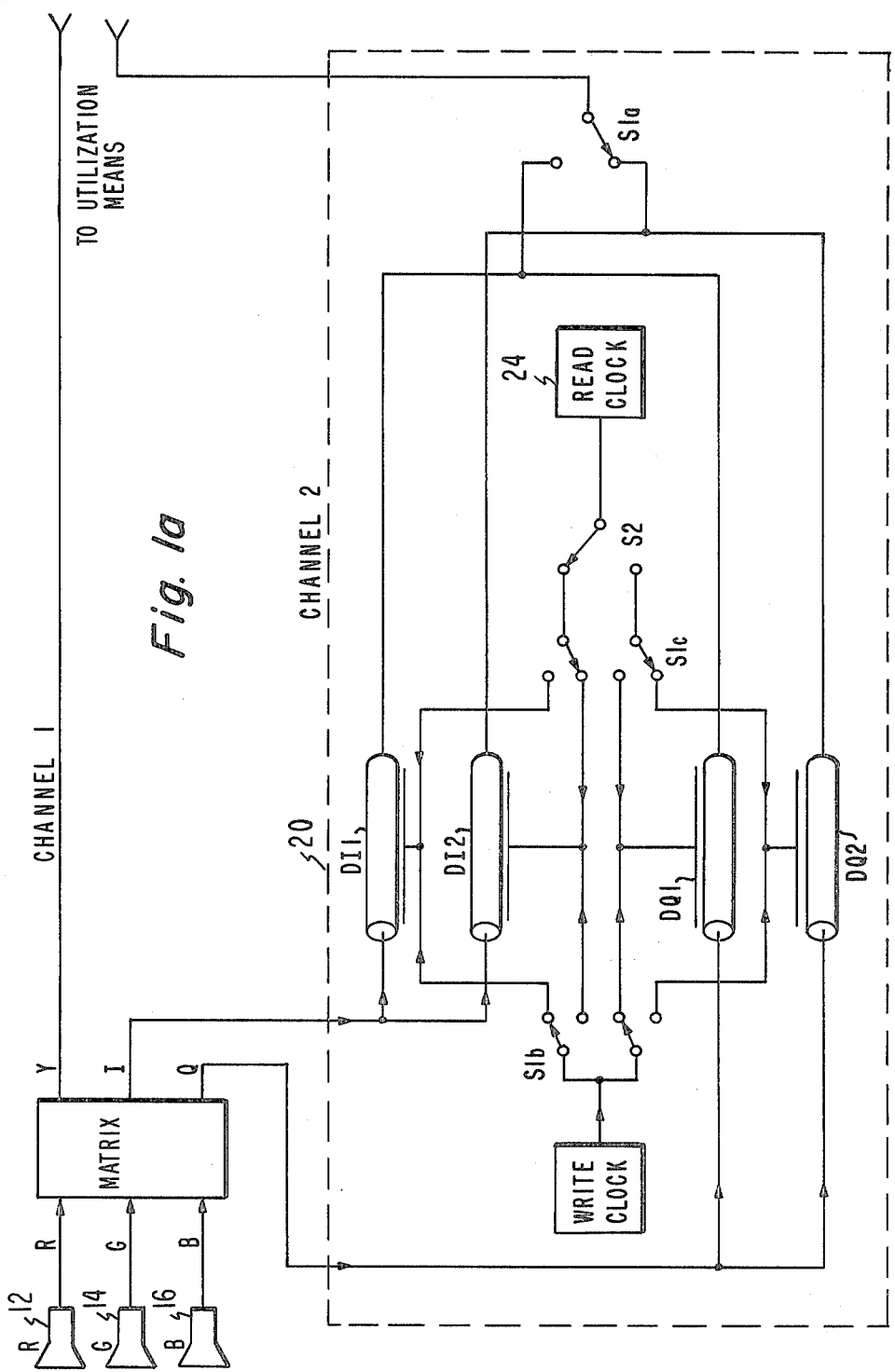

FIG. 1a illustrates a generalized transmission system to which color television signals are applied. In this instance, the television signals are generated by a matrix 10 which receives red (R), green (G) and blue (B) baseband video signals from individual video cameras 12, 14 and 16, respectively. Matrix 10 processes this plurality of baseband components defining luminance and chrominance information to produce luminance (Y) information which is coupled directly by a first channel of the transmission system to a utilizing means (not shown). Matrix 10 also forms further baseband components conventionally known as I and Q signals representative of the chrominance information being processed, and couples them to a signal processor 20 of a second channel of the transmission system. The I signals are coupled in parallel to the inputs of clocked delay lines DI1 and DI2 of processor 20 for further processing, and the Q signals are coupled in parallel to the inputs of further clocked delay lines DQ1 and DQ2. (Delay lines are designated generally by the letter D, those processing I information are also designated by the letter I, those processing Q information by the letter Q.) The outputs of delay lines DI1 and DQ1 are coupled in parallel, and the outputs of delay lines DI2 and DQ2 are coupled in parallel. A single-pole, double-throw switch S1A switches alternately between the parallel outputs of the delay lines for selecting the output signal of processing portion 20 of the transmission channel. The remainder of processing portion 20 of the second transmission channel is a clocking arrangement by which sequential processing of the I and Q signals in the delay lines is accomplished without loss of information and the consequent loss of resolution.

A write clock generator 22 is coupled by a double-pole, double-throw switch S1B to pairs of delay lines DI, DQ for clocking the delay lines to cause signals to be coupled therethrough. For example, at the time illustrated in FIG. 1, switch S1B couples the write clock signal to DI1 and to DQ1. A read clock generator 24 is also coupled to delay lines DI, DQ by way of a double-pole double-throw switch S1C and a single-pole double-throw switch S2. A switch drive means (not shown) drives switches S1A, S1B, and S1C synchronously at the horizontal rate and drives switch S2 at twice the horizontal rate. Switch S1 toggles at a time during the horizontal blanking interval and switch S2 toggles synchronously with switch S1 and also at a time near the center of each horizontal line interval.

Clocked delay lines D in the embodiment of FIG. 1 may include charge-transfer devices of the type known as charge-coupled devices (CCD) which are well known in the art. Each CCD consists of a number of cells which when clocked cause a sequential transfer from cell to cell of charge packets representing analog signals. Thus, each delay line may be considered a sampled analog delay line, the sample rate of which is determined by the clock rate and the delay of which is determined by the clock rate of the number of cells. The clocking rate of generator 22 is selected based upon the maximum frequency which may be expected in the signals being processed through the delay lines so as to provide a faithful reproduction of the signal as determined by Nyquist's criterion. For example, the minimum frequency of write clock generator 22 might be selected to be twice the maximum frequency expected to be processed through a delay line. The number of cells in each delay line D is selected to have a propagation delay of 1 H, which is sufficient delay to store an I or Q signal occurring during one horizontal line. Read clock generator 24, in a particular embodiment of the invention, has its frequency selected so as to allow signal to propagate through a delay line at twice the writing rate, thereby allowing the signal representing an entire horizontal line of chrominance information to be read out of a delay line during an interval equal to one-half of a horizontal line.

Figure 1B:
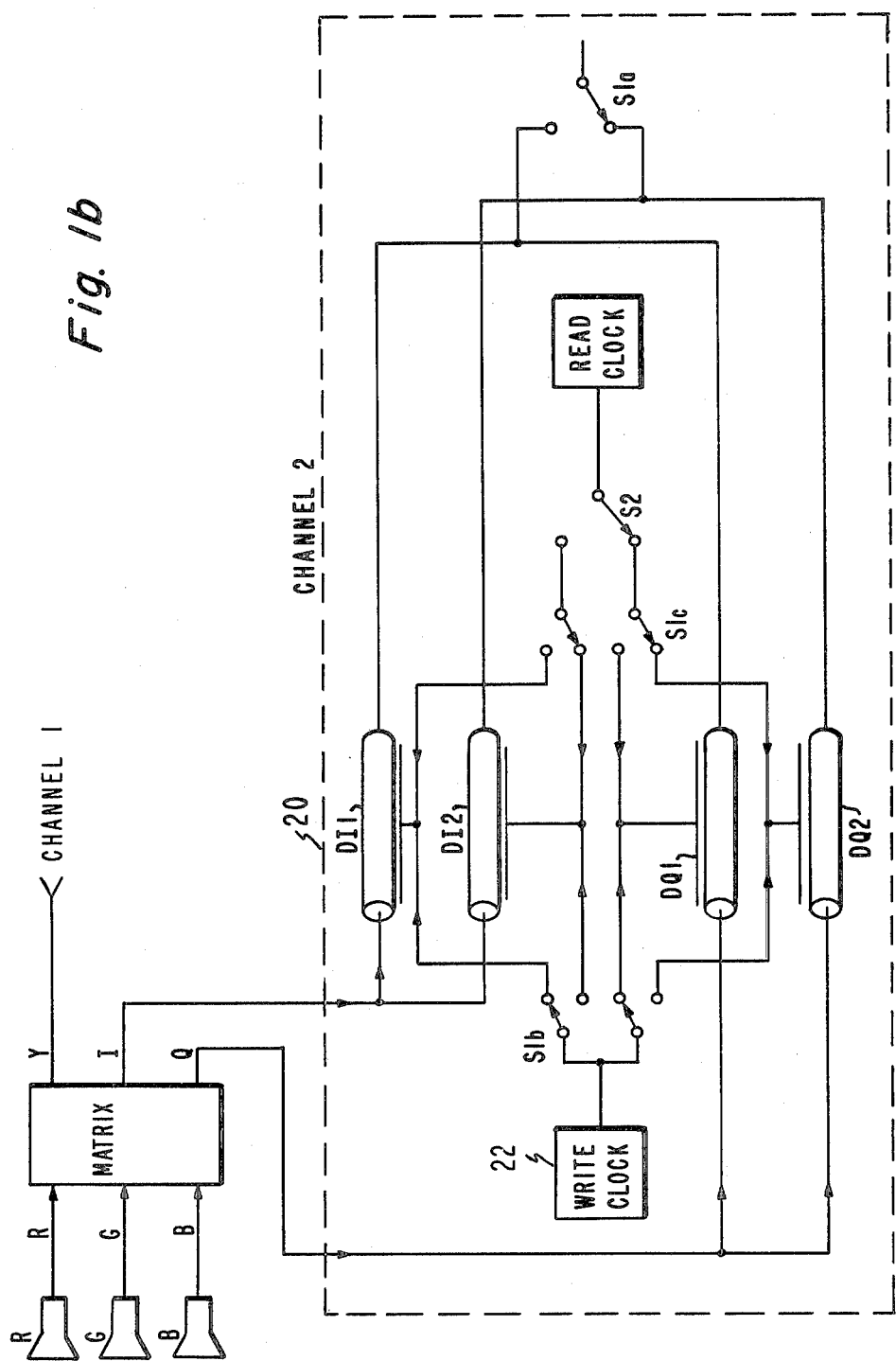
Figure 1C:
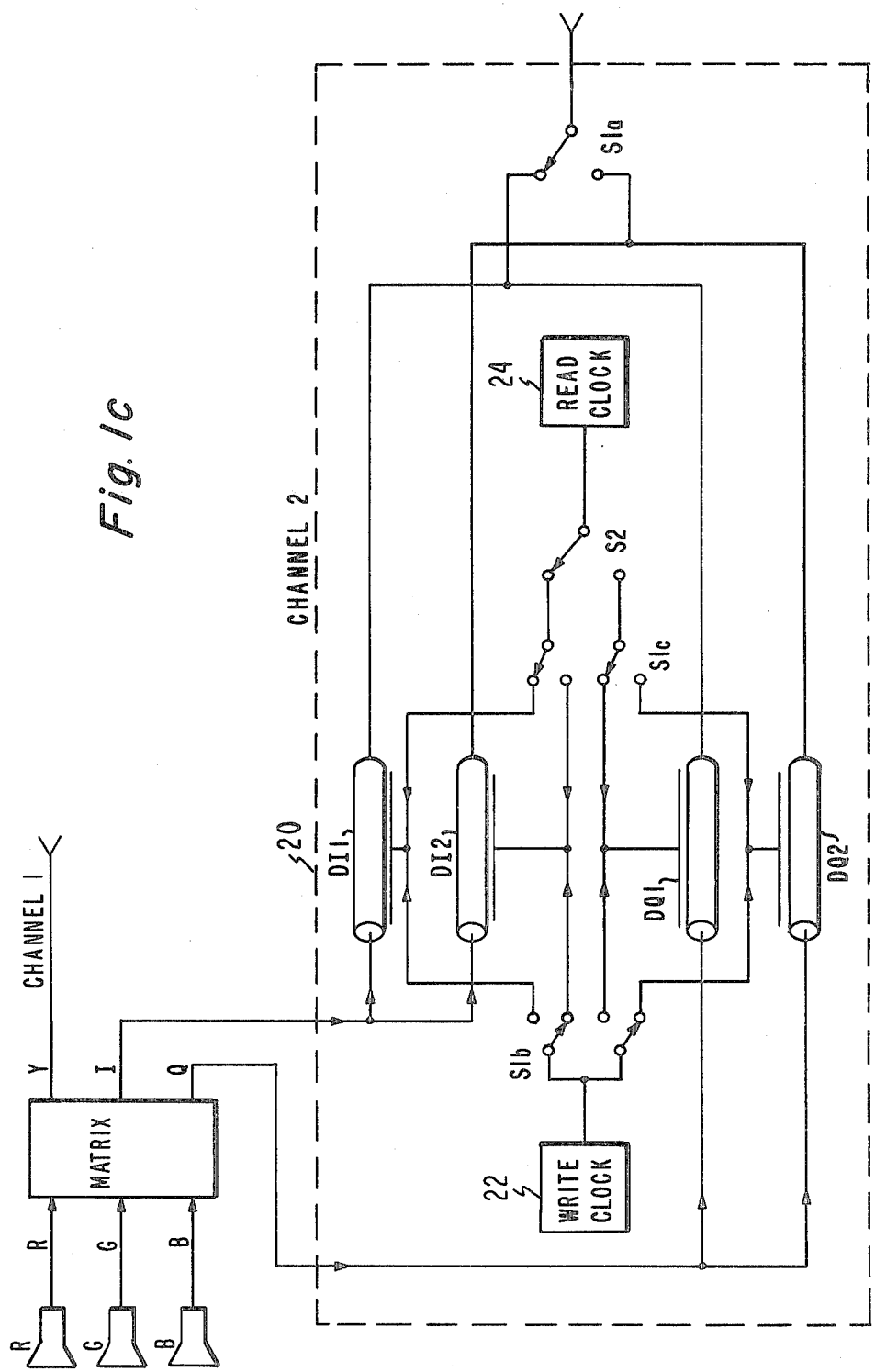
Figure 2:
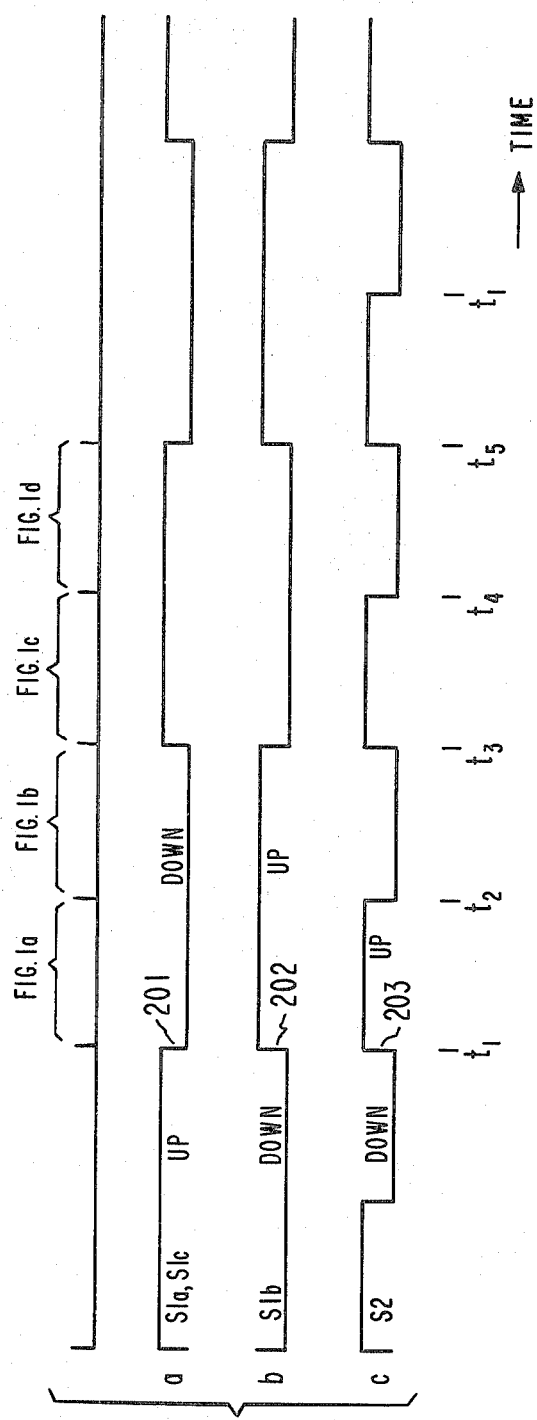
FIG. 2 illustrates a state diagram useful in understanding the operating cycle.

Prior to time T1, as illustrated in FIG. 2, DI2 and DQ2 were clocked at the write rate so as to store the entire I and Q signals, respectively, for the preceding horizontal line. Delay lines DI1 and DQ2 contain material unsuitable for transmission. At time T1, which may occur during a horizontal blanking interval or during a transition from one line to the next, the condition of switches S1 and S2 changes as shown by waveforms 201, 202 and 203 of FIGS. 2a, 2b and 2c, respectively. A high condition of any of waveforms 201–203 represents an "up" condition of the switch associated with that waveform. Thus, in the interval between time T1 and T2 of FIG. 2, switches S1A and S1C are in a "down" position as represented by a low condition of waveform 201; switch S1B is in an "up" position as represented by a high condition of waveform 202; and switch 2 is in an "up" position as represented by waveform 203. Thus, the condition of the switches of FIG. 1 in the interval T1-T2 is that condition represented in FIG. 1a. Similarly, the condition of the switches in the interval T2-T3 is that condition illustrated in FIG. 1b, and FIGS. 1c and 1d represent the condition of the switches in the intervals T3-T4 and T4-T5, respectively. The condition of the switches repeats cyclically.

In the interval preceding time T1, as mentioned, DI2 and DQ2 were clocked by write clock generator 22 so as to store in DI2 and DQ2 a sampled analog version of the I and Q signals occurring in the preceding line. DI1 and DQ1 contain unsuitable information. At time T1, the switch configuration becomes that of FIG. 1a, as indicated by FIG. 2. Write clock generator 22 becomes coupled at time T1 to DI1 and DQ1, which begin clocking at the writing rate to progressively store the I and Q signals occurring in the interval T1-T2. The unsuitable material stored therein is simultaneously clocked out, but the unsuitable material is decoupled from the output of transmission processor 20 at switch S1A and does not affect the output signal. Delay line DQ2 remains in a passive storage mode in interval T1-T2. Also in the interval T1-T2, read clock generator 24 is coupled to delay line DI2, and the I signal stored therein is clocked out at twice the rate at which it was clocked in. The signal clocked out of DI2 is coupled by switch S1A to the output of transmission processor 20. While DI2 is clocking out, the I signal at its input is also clocked into cells of delay line DI2. However, the current line I information is not coupled to the output of processor 20 because at the moment that the first of the current line information would begin to exit from DI2, switch drive signal 203 takes a transition representing the switching of S2 to produce the configuration shown in FIG. 1b.

As illustrated in FIG. 1b, write clock generator 22 continues to be coupled during interval T2-T3 to DI1 and DQ1 for loading or storing the current line I and Q information. However, no clocking signals at all are coupled to DI2, and it becomes passive and retains the stored I information from the first half T1-T2 of the first horizontal line T1-T3. Switch S1C couples read clock 24 to previously passive DQ2. DQ2 contains the Q information from the horizontal line preceding time T1. Beginning at time T2, this I signal is clocked to the output of transmission processor 20. As in the case of DI2, the clocking out of the stored information causes the storage in DI2 of Q information from the current line. However, Q information from the current line cannot begin to exit from DQ2 until after time T3. At time T3, the first horizontal line ends and the second horizontal line begins.

At time T3, the condition of the switches of FIG. 1 changes as indicated by waveforms 201-203, and in the interval T3-T4 the condition is as illustrated in FIG. 1c. In FIG. 1c, DI2 and DQ2 are coupled to the write clock and their parallel outputs are decoupled from the output of processor 20. Consequently, DI2 begins to store currently generated I signal and DQ2 begins to store currently generated Q signal. The unusable half-line information stored therein during the previous line is clocked out as current signal is stored. During the interval T3-T4, DQ1 is not clocked and merely retains the stored Q information from horizontal line T1-T3. DI2, however, is coupled to read clock generator 24, and begins to read out the I information stored during line T1-T3 in a manner similar to that already described. At time T4, when all of the I information relating to horizontal line T1-T3 has been read out, but before I information stored subsequent to time T3 has been read out, the switch configuration again changes to that represented by waveforms 201-203 of FIG. 2 in the interval T4-T5. This configuration is illustrated in FIG. 1d. In FIG. 1d, it will be recognized that the configuration of FIG. 1d occurring in the interval T4-T5 allows loading in DI2 and DQ2 of the I and Q signals then being generated, and allows DQ1 to be read so as to couple to the output of processor 20 the Q signal stored during interval T1-T3 of the preceding horizontal line. At time T5, then, DI2 and DQ2 are loaded with information which is not useful for transmission and DI1 and DQ1 are loaded with the I and Q, respectively, information from the preceding line. This will be recognized as the same condition as that which preceded time T1, and that the cycle as described can repeat.

Thus, the arrangement of FIG. 1 represents a two-channel transmission system in which the luminance information is transmitted on one channel and the chrominance information is represented by baseband I and Q signals which are generated concurrently, stored and then time compressed by a factor of 2:1 for sequential coupling to the second channel of the transmission system. This transmission system maintains high resolution and has improved signal-to-noise. It should be noted that operation of the delay line D at twice the clock rate for time compression also results in a doubling of the signal frequencies associated with the I and Q signals, and this in turn affects the minimum allowable bandwidth of channel 2 of the arrangement of FIG. 1.

Figure 3A:
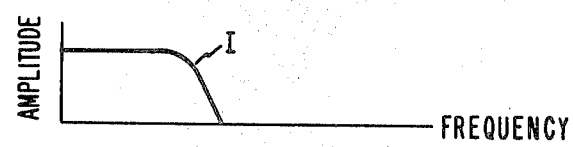
FIG. 3, including a-f, illustrates bandwidths of signals and the time sequence of the signals useful in understanding certain aspects of the invention.
Figure 3B:
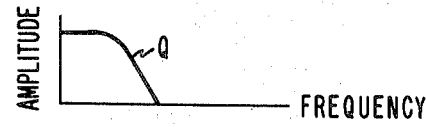
Figure 3C:
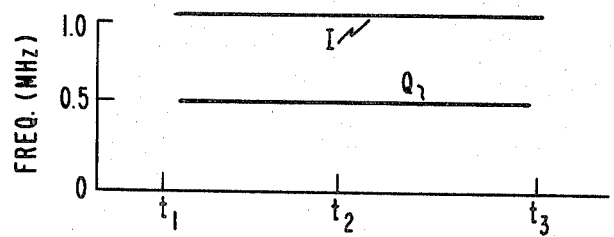
Figure 3D:
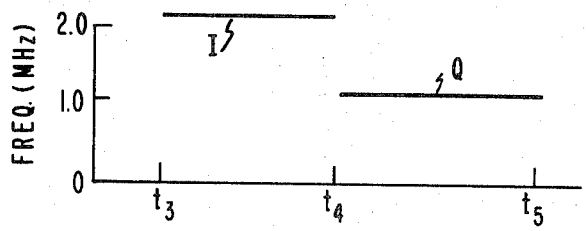
Figure 3E:
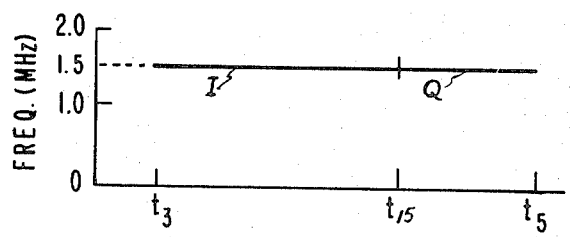
Figure 3F:
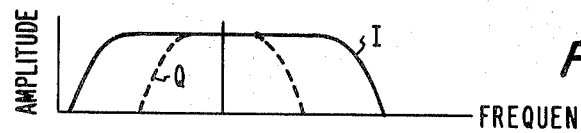

Commonly, the I chrominance signal has a greater signal bandwidth than the Q signal. This is illustrated in FIGS. 3a and 3b. Over the interval T1-T3, the bandwidth remains constant as illustrated in FIG. 3c. The I signal has a 1.0 MHz bandwidth and the Q signal has a 0.5 MHz bandwidth. FIG. 3d illustrates the result of time-compressing the I and Q signals of FIGS. 3a-3c equally for sequential presentation in the interval T3-T5. The I signal presented in the interval T3-T4 has a 2 MHz bandwidth representing the doubling of the 1 MHz bandwidth as it was generated, and the doubled frequency of the Q signal is only 1.0 MHz. Consequently, in the interval T4-T5 the bandwidth of channel 2 of the transmission system is under-utilized. By appropriate selection of the duration of the read-out interval and the read-out clock frequency, the bandwidth of the time-compressed I and Q signals can be made equal, as illustrated in FIG. 3e. If the interval T3-T15 during which the I signal is read-out is two-thirds of the available read-out time and the time interval T15-T5 in which the Q signal is read out is one-third the available time, the bandwidth of the I signal as generated is multiplied by 3/2 to 1.5 MHz as illustrated in FIG. 3e and the Q signal is multiplied by 3. With such an apportionment of the compression based on the signal bandwidth, the channel bandwidth use is maximized.

Figure 4:
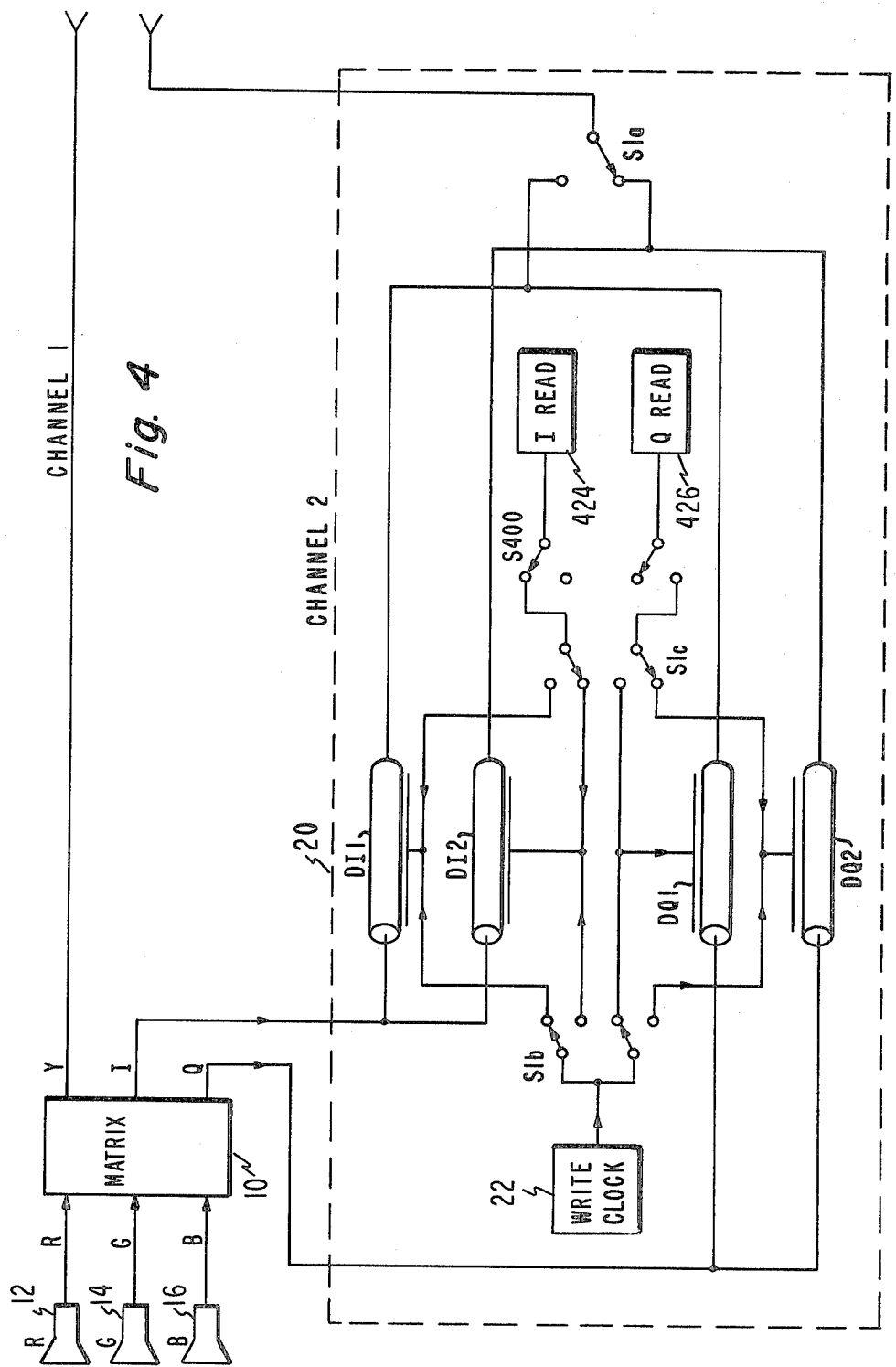
FIG. 4 is a diagram in block and schematic form of a two-channel transmission system embodying the invention and having certain bandwidth advantages.

FIG. 4 illustrates an arrangement by which the I and Q signal as sequentially presented for transmission may have the same bandwidth. In FIG. 4, elements corresponding to those of FIG. 1 are provided with the same reference numerals. Reference to FIG. 2 and to the description of the operation of FIG. 1 will reveal that when waveform 203 is high representing an up condition for switch 2, I is being read, and when S2 and waveform 203 are down, Q is being read. Consequently, a double-pole double-throw (DPDT) switch S400 may be substituted for SPDP switch S2 of FIG. 1a. A first half of switch S400 connected as shown in FIG. 4 is connected to an I read clock generator 424 and a second pole is connected to a Q read clock generator 426. Generators 424 and 426 are at different frequencies. The I read clock is selected to read-out I information from delay lines DI in ⅔ of a horizontal line and Q read clock generator 426 has a frequency selected to read Q information from the DQ delay lines in ⅔ of a line. Thus, in the example given (I bandwidth as generated of 1 MHz and 0.5 MHz for Q and with ⅔ of the transmission time devoted to I and ⅓ to Q), the I read clock would be at a frequency or rate of 1.5 times that of the write clock, while the Q read generator would be at a rate of 3 times the write clock rate.

The descriptions of the embodiments of FIGS. 1 and 4 are somewhat simplified in that it has been assumed that chrominance information is generated during the horizontal blanking interval. Generally speaking, this is not the case. Thus, the switching of switches S1, S2 and S400 may include a condition in which the delay lines D are not clocked at all, so as to avoid entering or coupling out information during the horizontal blanking interval. Also, it will be obvious to those skilled in the art that signals stored during the active portion of each horizontal line may be read-out during the interval including the blanking interval, thereby allowing a reduction in the bandwidth required for transmission of the sequential I and Q signals by the ratio of the active video time (approximately 53 microseconds) in each horizontal interval to the total horizontal interval (63.5 microseconds).

If the direction of the delay lines D of the transmission processors 20 of FIGS. 1 and 4 are reversed so that the signals proceed from right to left rather than from left to right, the encoders may be operated in reverse mode as decoders of the sequentially coded signals. Thus, for example, the I and Q signals sequentially encoded with equal times as described in conjunction with FIG. 1 may be applied to the common terminal of switch S1A for sequentially writing into a DI and DQ delay line. Clock generator 22 clocks the information out in parallel to produce concurrent I and Q signals from the sequentially stored information.

It will be apparent that R-Y and B-Y chrominance signals representing chrominance information may be processed rather than I and Q signals by an arrangement such as that shown in FIG. 1a. However, because the R-Y and B-Y signals ordinarily have equal bandwidths, the arrangement of FIG. 4 would not be used unless unequal output bandwidths were desired.

Figure 5:
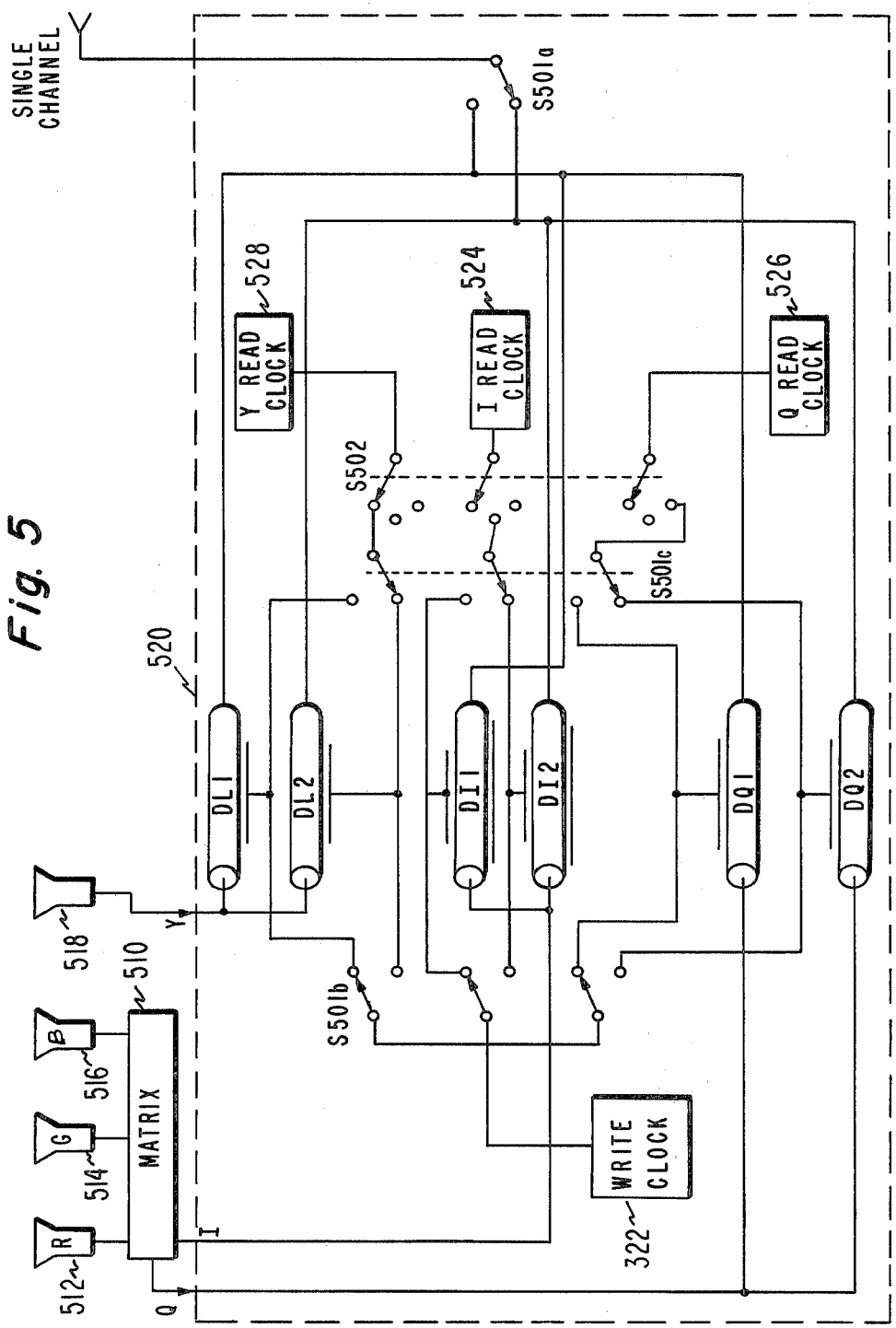
FIG. 5 is a diagram in block and schematic form of a single-channel transmission system embodying the invention.

FIG. 5 illustrates a transmission arrangement in which luminance and chrominance information are sequentially coupled to a transmission system. In FIG. 5, elements corresponding to those in FIGS. 1 and 4 are provided with corresponding reference numerals in the 500 series. Three separate read clock generators 524, 526 and 528 are provided for reading out the I, Q and Y components at different rates so as to provide equal bandwidth. If it is assumed that the normal bandwidth of the Y signal is 4 MHz, the normal I bandwidth is 1 MHz and the normal Q bandwidth is 0.5 MHz, and if transmission time during each horizontal line interval is apportioned eight parts to the luminance, two parts to I and one part to Q, then the bandwidth of the luminance increases to 11/8 times 4 MHz, which is 5.5 MHz. The corresponding I frequency is found by multiplying 1 MHz by 11/2 which yields 5.5 MHz. Similarly, the Q frequency as compressed is 11×0.5 or 5.5 MHz. Consequently, the total bandwidth of the channel remains at 5.5 MHz throughout the transmission interval and couples the entirety of the color television signal, without loss, with a total bandwidth of 5.5 MHz. Thus, a 5.5 MHz bandwidth channel can carry the entire luminance and chrominance information without degradation of resolution. This is less than the bandwidth that would be required to transmit the luminance plus quadrature-modulated chrominance information, and yet it provides better signal-to-noise performance.

Figure 6:
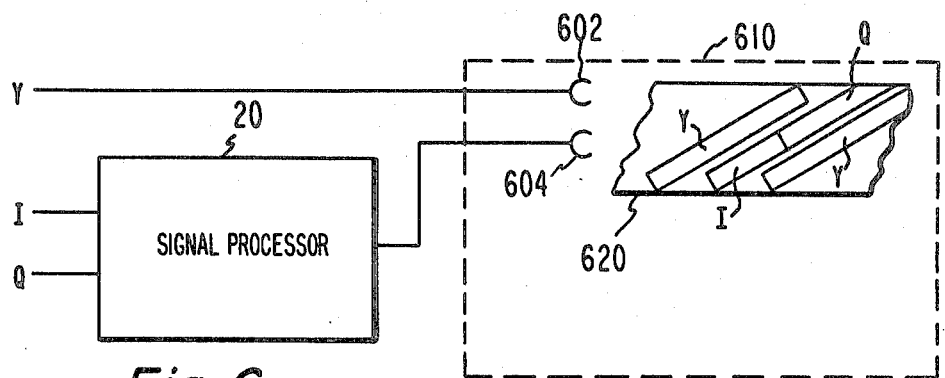
FIG. 6 illustrates a two-channel transmission system including a tape record according to the invention.
Figure 7:
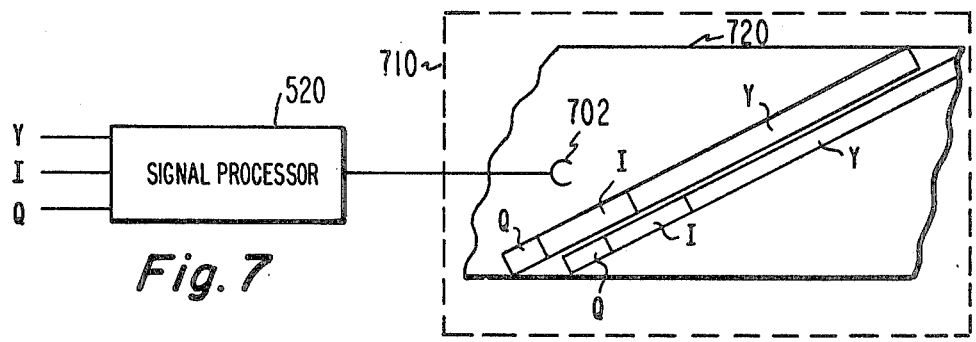
FIG. 7 illustrates a one-channel transmission system including a tape record according to the invention.
Figure 8:
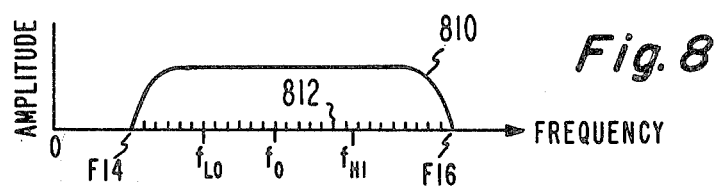
FIGS. 8 and 9 illustrate amplitude-frequency diagrams and spectra useful in understanding the advantages of the invention.
Figure 9:
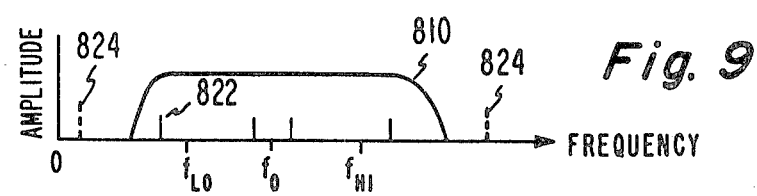

FIG. 6 illustrates a 2-channel transmission system in which a first channel carries a luminance signal and which a second channel receives I and Q signals which are processed by a signal processor 20 for sequential coupling of the I and Q signals to a second channel of the system. The first and second channels of the transmission system are coupled to first and second recording heads 602 and 604 in a video tape recorder 610. As illustrated in FIG. 6, a tape 620 has scanned thereon in parallel tracks the Y information and the sequential I and Q information. Of course, the I and Q information may be presented in either sequence. In FIG. 7, a transmission arrangement includes television signals coupled to a signal processor 520 for sequentially coupling luminance and chrominance information onto a single transmission channel. The single transmission channel is coupled to a single recording head assembly 702 in a tape recorder 710. As illustrated in FIG. 7, head 702 scans sequential tracks on a tape 720. Each track contains time-sequential luminance and chrominance information. The information may be in any order, and the form of the information is not restricted to Y, I and Q. For example, the baseband information defining the luminance and chrominance information may be R, G and B information having equal bandwidth, or, as often occurs, having a G component with greater bandwidth than the R and B bandwidth.

It will be obvious to those skilled in the art that the physical switches described for ease of understanding the invention may instead be solid-state equivalents such as those well-known in the art. Also, any signal source for producing baseband chrominance and luminance information may be used instead of the matrix shown. Instead of CCD delay lines D as illustrated in the embodiments shown, digital memories may be used.

As a further advantage of the described transmission system, the signal is scrambled by comparison with NTSC coded signals and cannot be received by an ordinary receiver. At the current state of the art, the CCD delay lines are expensive and this provides a measure of security from someone who might casually wish to develop a decoder. Thus, the described transmission channel may include a satellite transponding system used for restricted channels.

What is claimed is:

1. An improved multichannel television signal record system, in which luminance information is recorded separately from chrominance information, and wherein said chrominance information comprises first and second signal components, comprising:

a first channel for recording luminance signals;

a second channel for recording said chrominance information, said second channel being subject to nonlinearities which may cause cross-modulation between said first and second signal components of said chrominance information when said first and second signal components are processed concurrently;

wherein the improvement comprises:

switching means coupled to said second channel for alternately coupling said first and second signal components of said chrominance information for recording in said second channel whereby said first and second signal components are processed alternately rather than concurrently thereby eliminating said cross-modulation.

2. A system in accordance with claim 1 further comprising storage means coupled to said second channel and to said switching means for alternately storing said first and second signal components during those intervals in which said second and first signal components, respectively, are coupled for recording.

3. A system in accordance with claim 1 or 2 wherein said first and second signal components are R-Y and B-Y signals, respectively.

4. A system in accordance with claim 1 or 2 wherein said first and second signal components are I and Q, respectively.

5. A system according to claim 1 further comprising a matrix for forming said first and second signal components whereby said first and second signal components have the same bandwidth.

6. A system according to claim 1 or 5 wherein said switching means couples said first and second signal components of said chrominance information alternately to said second channel during first and second sequential intervals, respectively, and wherein said first and second intervals are of equal duration.

7. A system according to claim 1 further comprising controllable time-compression means coupled to receive said, first and second signal components as they are generated and adapted for generating time-compressed first and second signal components for recording during first and second sequential intervals;

control clock means coupled to control input terminals of said controllable time-compression means for controlling the writing and reading rates of said controllable time-compression means, for controlling said time compression, said clock means having frequencies selected so that the ratio of the duration of said first interval to said second interval equals the ratio of the bandwidth of said first signal component to the bandwidth of said second signal component.

8. A system according to claim 7 wherein said time-compression means further comprises storage means coupled to said switching means for storing said first signal during said second intervals and for storing said second signal during said first intervals for preventing loss of resolution of said chrominance.

9. A system according to claim 8 wherein said storage means comprises delay means.

10. A system according to claim 9 wherein said delay means comprises a clocked delay line.

* * * * *

Disclaimer

4,376,957.—*Robert A. Dischert*, Burlington and *Robert E. Flory*, Princeton, N.J. TRANSMISSION SYSTEM WITH SEQUENTIAL TIME-COMPRESSED BASEBAND COLOR. Patent dated Mar. 15, 1983. Disclaimer filed Sept. 11, 1984, by the assignee, *RCA Corp.*

Hereby enters this disclaimer to all claims of said patent.

[*Official Gazette October 9, 1984.*]